B. A. BROCK.
MOTOR CYCLE.
APPLICATION FILED FEB. 28, 1917.

1,279,081.

Patented Sept. 17, 1918.

INVENTOR
Bert A. Brock
BY
Fred P. Gorin
ATTORNEY

UNITED STATES PATENT OFFICE.

BERT A. BROCK, OF SEATTLE, WASHINGTON.

MOTOR-CYCLE.

1,279,081.  Specification of Letters Patent.  Patented Sept. 17, 1918.

Application filed February 28, 1917. Serial No. 151,463.

*To all whom it may concern:*

Be it known that I, BERT A. BROCK, a citizen of the United States, and a resident of Seattle, in the county of King and State of Washington, have invented certain new and useful Improvements in Motor-Cycles, of which the following is a full, true, and exact specification.

My invention relates to motor cycles and has for its principal object: to provide a novel, improved and cheapened type of motor cycle; to provide a motor cycle in which the engine is positioned within the outline of a rear wheel, and which is geared direct to the wheel. Another object of my device is to provide an interchangeable frame bar which may be adjusted from one position to another in order to convert the motor cycle into either a gentleman's or lady's motor cycle as the case may be.

Figure 1:
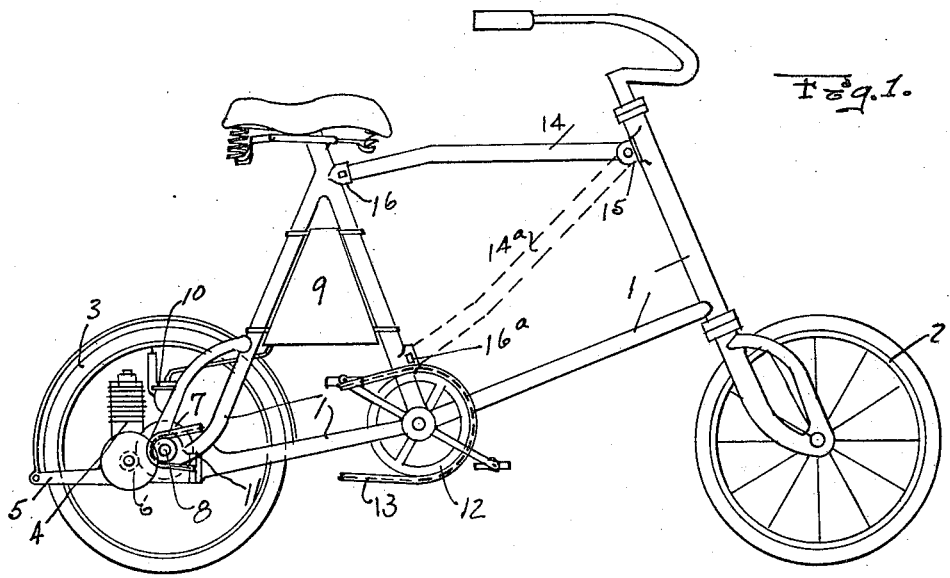
Figure 2:
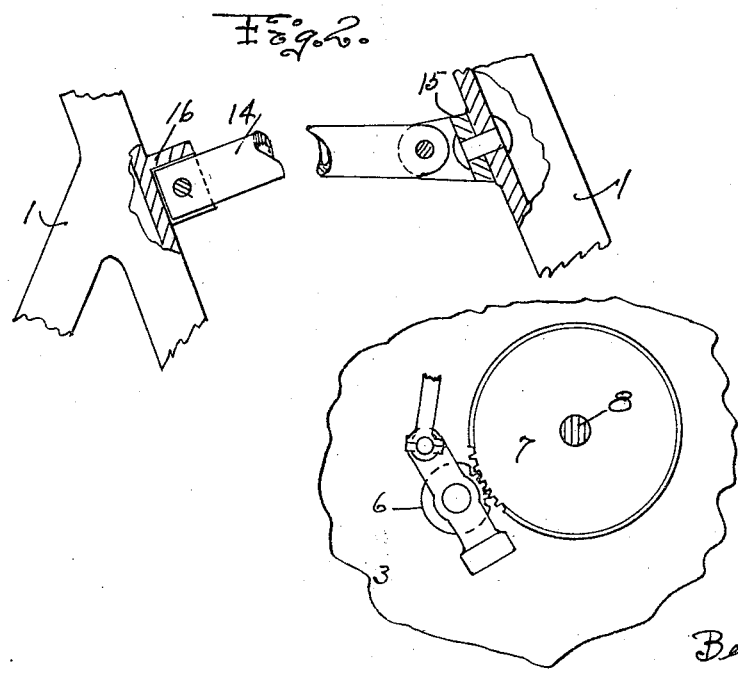
Figure 3:
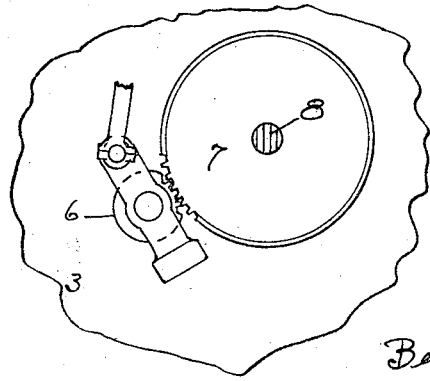

Other objects will appear as my invention is more fully explained in the following specifications, illustrated in the accompanying drawings and pointed out in the appended claims:

In the drawings Figure 1 is a side elevation of my improved motor cycle with parts broken away and others omitted. Fig. 2 is an enlarged detail view of my improved frame bar and connections. Fig. 3 is an enlarged detail view of a connection between the engine crank shaft and the motor cycle wheel.

Referring more particularly to the drawings, numeral 1 indicates the frame wheel of a motor cycle within which is mounted a front wheel 2 and a rear wheel 3. The frame so far as described is not materially different from other bicycle and motor cycle frames except that the rear fork of the frame is spread somewhat in order to receive the additional mechanism due to the engine connection. The wheels of my motor cycle are smaller than the usual motor cycle wheels and the machine is generally of lighter construction, and is in many ways similar to a bicycle. A small gasolene engine 4 is mounted to an extension 5 of the frame 1 and is provided with a pinion 6 which meshes directly with a gear 7, which is attached directly to the shaft 8 of the rear wheel 3. The engine is supplied with the usual gasolene tank 9 and carbureter 10. In order to brake my motor cycle I employ a standard coaster brake 11 upon the rear shaft. The coaster brake is geared to a pedal wheel 12 by means of a chain 13 in the usual manner. The pedal wheel and its connections may also be used to assist the engine in hill climbing or the like. An interchangeable connection 14 is pivoted to a pivot block 15 which in turn is pivoted to the forward fork of frame 1. The other end of connection 14 is removably bolted to a slotted bearing 16 which is a part of the rear portion of frame 1. In the position shown in Fig. 1, the connection bar 14 is as used in a gentleman's motor cycle, while when reversed and placed in position as shown in dotted lines 14$^a$ in Fig. 1, it is as used on a lady's motor cycle. This convertible feature is important in applicant's device. In order to change the connection 14, it is only necessary to unbolt it from the rear portion of frame 1, to depress the unbolted end from connection with the bearing 16 and to revolve the connection bar through an angle of 180°, at which time it will be in position for inserting within a bearing 16$^a$, which is similar to 16. When resting in the bearing 16$^a$, the connection bar is again bolted solid.

While I have shown a particular form of embodiment of my invention, I am aware that many minor changes therein will readily be suggested to others skilled in the art without departing from the spirit and scope of the invention, and I therefore desire to avoid being limited to the exact form shown and described.

Having described my invention, what I claim as new and desire to protect by Letters Patent, is:

1. In a motor cycle frame, the combination of a curved and interchangeable connection bar, a pivot block revolubly pivoted to the said frame and hingedly pivoted to one end of said connection bar, whereby the bar may be moved universally, open bearings upon the said frame, bolt means for connecting the other end of said connection bar at either of the said open bearings, whereby the said frame may be made convertible from a gentleman's motor cycle frame to a lady's motor cycle frame.

2. In a motor cycle frame the combination of a vertically curved and interchangeable connection bar, a pivot block pivoted to one of the frame members and hingedly connected to one end of the said connection bar, whereby the connection bar may be rotated about the pivot point of the pivot block and hinged about its connection to the said block, a pair of open bearings secured to another frame member and each at an equal distance from the hinge point of the said connection bar, whereby the other end of the connection bar may be engaged selectively by one of the bearings, and bolt means for retaining the connection bar in coöperation with the open bearings, whereby the motor cycle frame may be made convertible from a gentleman's motor cycle frame having an upwardly bend connection bar to a lady's motor cycle frame having a downwardly bend connection bar.

BERT A. BROCK.

Copies of this patent may be obtained for five cents each, by addressing the "Commissioner of Patents, Washington, D. C."